US009470259B2

United States Patent
Nordloh et al.

(10) Patent No.: US 9,470,259 B2
(45) Date of Patent: Oct. 18, 2016

(54) PROCESS FOR MANUFACTURING A BALL AND SOCKET JOINT AND BALL AND SOCKET JOINT MANUFACTURED ACCORDING TO THE PROCESS

(71) Applicants:Alfons Nordloh, Visbek (DE); Volker Grube, Diepholz (DE); Metin Ersoy, Walluf (DE)

(72) Inventors: Alfons Nordloh, Visbek (DE); Volker Grube, Diepholz (DE); Metin Ersoy, Walluf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 742 days.

(21) Appl. No.: 13/743,820

(22) Filed: Jan. 17, 2013

(65) Prior Publication Data
US 2014/0199113 A1    Jul. 17, 2014

Related U.S. Application Data

(63) Continuation of application No. 11/996,149, filed as application No. PCT/DE2006/001165 on Jul. 5, 2006.

(30) Foreign Application Priority Data

Jul. 19, 2005    (DE) .................. 10 2005 034 210

(51) Int. Cl.
*F16C 11/00*    (2006.01)
*F16C 11/06*    (2006.01)

(52) U.S. Cl.
CPC ........ *F16C 11/0685* (2013.01); *F16C 11/0628* (2013.01); *F16C 11/0657* (2013.01); *F16C 2220/06* (2013.01); *Y10T 29/49826* (2015.01); *Y10T 403/32631* (2015.01)

(58) Field of Classification Search
None
See application file for complete search history.

(56) References Cited

U.S. PATENT DOCUMENTS

| | | | | |
|---|---|---|---|---|
| 5,092,703 | A * | 3/1992 | Kobayashi | B29C 45/14 403/122 |
| 6,109,816 | A * | 8/2000 | Iwasaki | B60G 7/005 403/122 |
| 7,125,513 | B2 * | 10/2006 | Abels | B29C 45/14754 264/259 |
| 2004/0130070 | A1 * | 7/2004 | Abels | B29C 45/14754 264/328.1 |

* cited by examiner

*Primary Examiner* — Victor MacArthur
(74) *Attorney, Agent, or Firm* — McGlew and Tuttle, P.C.

(57) ABSTRACT

A process for manufacturing a ball and socket joint and a joint manufactured according to that process are provided for a simple manufacture of a completely assembled ball and socket joint with a low torque and overturning moment. The joint housing is manufactured in an injection or casting process, in which the joint ball with the bearing shell placed on it is surrounded by a metallic material or a plastic. The joint shell is provided with a bulge, which behaves elastically with respect to the pressure acting during the injection or casting process and arches slightly outwardly after the conclusion of the injection or casting process. It is achieved as a result that the joint shell does not lie over its entire area on the joint ball after the injection or casting process.

18 Claims, 5 Drawing Sheets

PROCESS FOR MANUFACTURING A BALL AND SOCKET JOINT AND BALL AND SOCKET JOINT MANUFACTURED ACCORDING TO THE PROCESS

CROSS REFERENCE TO RELATED APPLICATIONS

This application is a continuation of application Ser. No. 11/996,149 filed Jan. 18, 2008, which is a United States National Phase application of International Application PCT/DE2006/001165 and claims the benefit of priority under 35 U.S.C. §119 of German Patent Application DE 10 2005 034 210.8 filed Jul. 19, 2005, the entire contents of which are incorporated herein by reference.

FIELD OF THE INVENTION

The present invention pertains to a process for manufacturing a ball and socket joint. It pertains, furthermore, to a ball and socket joint manufactured according to that process, wherein especially the joint shell or bearing shell of the ball and socket joint is designed according to the present invention in a special manner.

BACKGROUND OF THE INVENTION

Ball and socket joints transmit and absorb forces from several directions. They are used, for example, in the manufacture of vehicles in the area of the steering or the track rod. Bearings of this class comprise essentially a pivot pin, at one end of which a ball is formed, a shell accommodating the ball of the pivot as well as a joint housing receiving the shell and parts of the ball pivot. The ball of the ball pivot slides in the prestressed, permanently lubricated shell, which is protected by the housing against moisture and dirt. The joint housing is, moreover, protected additionally by a sealing bellows against dirt as well as against the escape of the lubricant on its side on which it is open for receiving the pivot. A rear-side opening of the joint housing, which is, moreover, frequently provided, is closed by a closing cover. The above-mentioned joint components are usually manufactured separately and subsequently fitted together in an assembly process. However, this can be considered to be disadvantageous in respect to the assembly effort.

A process, in which the joint shell is placed on the ball of the pivot pin and the complete arrangement obtained as a result is extrusion coated to fix the components and to form a joint housing, has therefore already been known from DE 195 13 714 C1. However, the procedure described in the document implies the risk that the joint shell is pressed by the pressure occurring during the extrusion coating with the housing onto the joint ball such that it will be in contact with it over its full surface. However, an excessively large contact surface disadvantageously leads to an undesired increase in the torque and overturning moment.

SUMMARY OF THE INVENTION

The object of the present invention is therefore to propose a process, which makes possible the manufacture of a completely assembled ball and socket joint, and as a result of which a reliably functioning ball and socket joint with a low moment of friction, as well as with a low torque and overturning moment, is obtained, in which sufficient lubrication of the sliding surfaces of the ball and socket joint and of the joint shell or bearing shell is ensured. Furthermore, a ball and socket joint that can be manufactured with this process shall be described.

Both the process proposed for accomplishing the object, and the ball and socket joint that can be manufactured according to that process, pertain to a ball and socket joint of a type that is known, in principle. This comprises a pivot pin with a joint ball formed at one end of the pivot pin; a joint housing, which receives the joint ball and is open on one side; a permanently lubricated, essentially spherical joint shell, which is arranged between the joint ball and the joint housing; and a sealing bellows closing the open side of the joint housing in the area of the transition between the joint ball and the shaft of the pivot pin projecting from the joint housing. The corresponding ball and socket joint is manufactured such that the joint housing is produced in an injection or casting process (for example, diecasting), in which the joint ball with the bearing shell placed on it is surrounded by housing material such as a metallic material or a plastic. However, the design of the joint shell, which is spherical, in principle, is slightly modified according to the present invention. The joint shell is provided for this purpose, in at least one area, with a bulge, which behaves elastically in relation to the pressure acting during the injection or casting process and bulges slightly outwardly after the conclusion of the injection or casting process in relation to the otherwise spherical shape of the joint shell or bearing shell. It is achieved as a result that the joint shell is not in contact with the joint ball over its full surface after the injection or casting process. To manufacture the ball and socket joint, the joint shell designed in the above-described manner is placed on the joint ball of the pivot pin and extrusion coated together with same. The sealing system is finally complemented with the sealing bellows in an assembly process following the injection or casting process.

Due to the fact that a full-surface contact between the joint shell and the joint ball is prevented, the moment of friction between the joint shell and the ball and socket joint as well as the torque and overturning moment are limited during the use of the ball and socket joint. Good running properties of the ball and socket joint and long service life of its components are ensured hereby. A metallic cover can be advantageously formed between the joint ball and the joint housing in a ball and socket joint with metallic joint housing in the course of a casting process. The joint housing is designed now such that it extends nearly up to the transition between the joint ball and the shaft of the pivot pin, the diameter of the joint housing in the area of its opening through which the pivot pin passes being smaller than the diameter of the joint ball. The resistance of the pivot pin to tearing out advantageously increases because of the metallic cover ensured hereby.

Corresponding to an advantageous variant of the present invention, the joint housing is provided with a shaft, in which a correspondingly shaped tube or a rod is also extrusion-coated in the course of the manufacture of the joint housing. An alternative possibility is to prepare only a shaft stub at the joint housing during the injection or casting and to arrange a tube or a rod to be connected thereto by driving in in the cold or hot state.

An elevation bulging outwardly is formed on the joint shell in the area of the pole of the joint ball in the ball and socket joint according to the present invention. The joint or bearing shell consists of a plastic, which is elastically deformable at least in the area of this bulge. The elastically deformable bulge of the bearing surface placed previously on the joint ball is pressed onto the surface of the joint ball during the injection or casting process carried out to prepare the joint housing. However, the bulge arches, at least partially, again outwardly after the end of the injection or casting process due to the special shaping and the selection of a corresponding, elastic material, for example, polyoxymethylene, polyamide, polyphenylene sulfide or polyphthalamide. As a result, a gap remains at least in the areas of the bulge between the inner contour of the joint shell and the joint ball. A full-surface contact between the bearing shell and the joint ball is thus avoided, as a result of which a reduction of the moment of friction as well as of the torque and overturning moment is achieved. Corresponding to a preferred variant of the ball and socket joint designed according to the present invention, the joint shell has, moreover, a ribbing in the area of the outwardly arching bulge on its inner surface. This ribbing is provided for the event the bulge exceptionally fails to spring back in the particular case after the conclusion of the injection or casting process because of tolerances concerning the pressure prevailing during the injection or casting process or of tolerances concerning the material and the shape of the joint shell. It is ensured by the ribbing in this case that the joint shell will not nevertheless lie with its full surface on the joint ball.

The ribbing mentioned may have different shapes from a geometric point of view. Corresponding to a possibility provided, a plurality of ribs extend, starting from the pole of the essentially spherical geometry, on the inner surface of the outwardly arched area of the joint shell, and a plurality of ribs arranged in parallel to each other as well as to the equator of the joint ball extend at right angles thereto. In another embodiment, the joint shell has a plurality of ribs, which intersect at right angles relative to a surface projection of the spherical surface, on its inner surface in the area of the outwardly arching bulge.

The ball shell preferably has, moreover, on the outer surface, a plurality of longitudinally extending rib-like sections, by which a means offering security against rotation is formed. This prevents rotation of the joint shell in the joint housing.

A ring, whose section projecting from the opening of the joint housing forms the seat for the sealing bellows, is inserted in the area of the opening of the joint housing between the joint housing and the joint shell in another preferred embodiment. The metallic cover between the joint housing and the joint ball is advantageously further increased hereby in case of a metallic joint housing.

The present invention will be explained below once again on the basis of exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
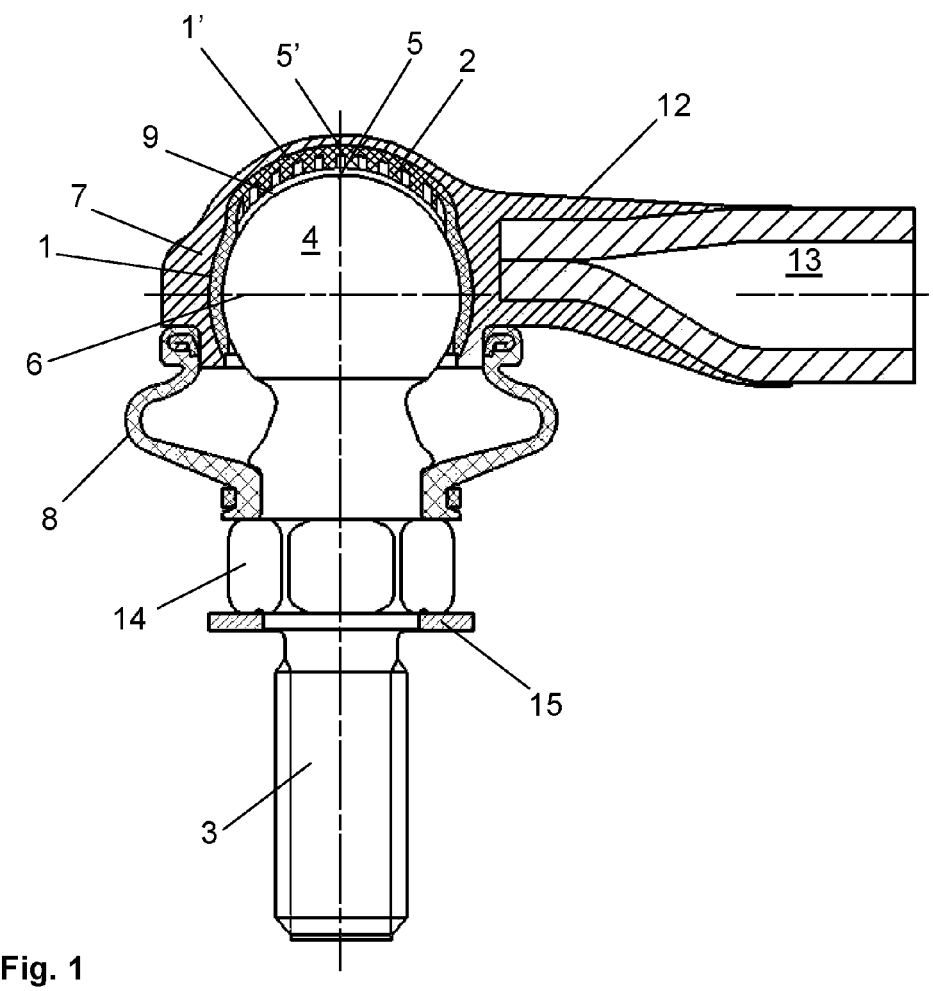
FIG. 1 is a partial sectional view showing a first embodiment of the ball and socket joint according to the present invention with a tubular shaft.

Referring to the drawings in particular, FIG. 1 shows a possible embodiment of the ball and socket joint according to the present invention. This comprises, a pivot pin 3, 4, whose joint ball 4 (known per se) is accommodated by a joint housing 7. A permanently lubricated joint shell 1, 1' is arranged between the joint housing 7 and the joint ball 4. The embodiment being shown was manufactured by placing the joint shell 1, 1' on the joint ball 4 and subsequently preparing the joint housing 7 by extrusion coating or casting around the joint shell 1, 1' and the joint ball 4. The sealing system was complemented with the sealing bellows 8 in a subsequent assembly operation.

To prevent the joint shell 1, 1' from being in contact with the joint ball 4 over its entire surface 9 after the extrusion coating process, the joint shell 1, 1' was designed in a special manner according to the basic idea of the present invention. As can be recognized, it has an outwardly arching bulge in the area of the pole 5 of the joint ball 4. In addition to this, a ribbing 2 is provided on the inner surface of the joint shell 1, 1' in the area of this bulge 1'. Full-surface contact between the joint shell 1, 1' and the joint ball 4 is prevented by these measures pertaining to the shaping of the joint shell 1, 1'. Even though the joint shell 1, 1' is pressed onto the surface 9 of the joint ball 4 during the injection or casting process, the bulge 1' provided on the joint shell 1, 1' will again bulge outwardly at least partially after the end of the injection or casting process. If this desired result exceptionally fails to materialize, it is ensured at least by the ribbing 2 provided on the inner contour that limitation of the moment of friction is achieved. A shaft 12 intended to be connected to additional elements is an integral part of the joint housing 7 in the ball and socket joint shown in FIG. 1. A metallic tube 13 is also extrusion coated for this during the manufacture of the joint housing.

Figure 2:
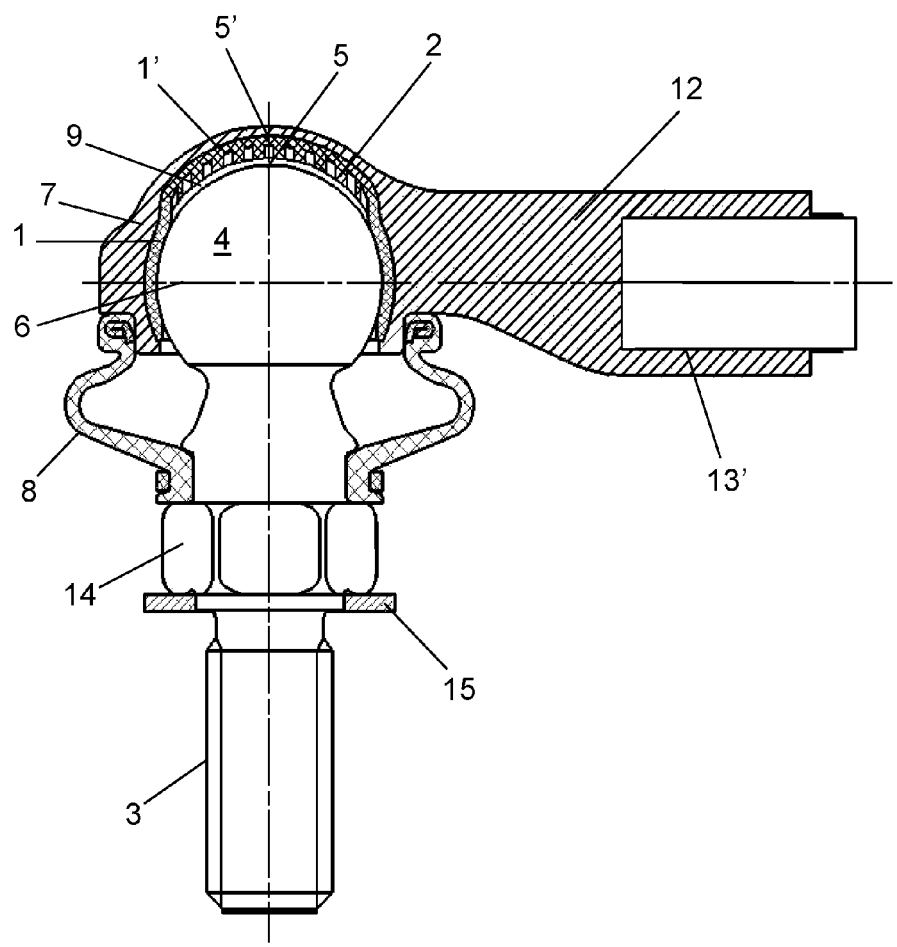
FIG. 2 is a partial sectional view showing a ball and socket joint comparable to the embodiment according to FIG. 1, whose housing is connected to a rod.

FIG. 2 shows an embodiment of the ball and socket joint according to the present invention, which is comparable, in principle, to FIG. 1. However, unlike in the embodiment explained above, a rod 13' is jointly extrusion coated here instead of a tube 13 to form the shaft 12. Just like the ball and socket joint according to FIG. 1, the contact shoulder of the ball pivot is designed in the form of a polygon 14. The service friendliness of the component is improved hereby. To compensate the reduction of the contact area, which results herefrom, a disk 15 is also pressed onto the pin or the shaft 3 of the ball pivot 3, 4 under the polygon 14.

Figure 3:
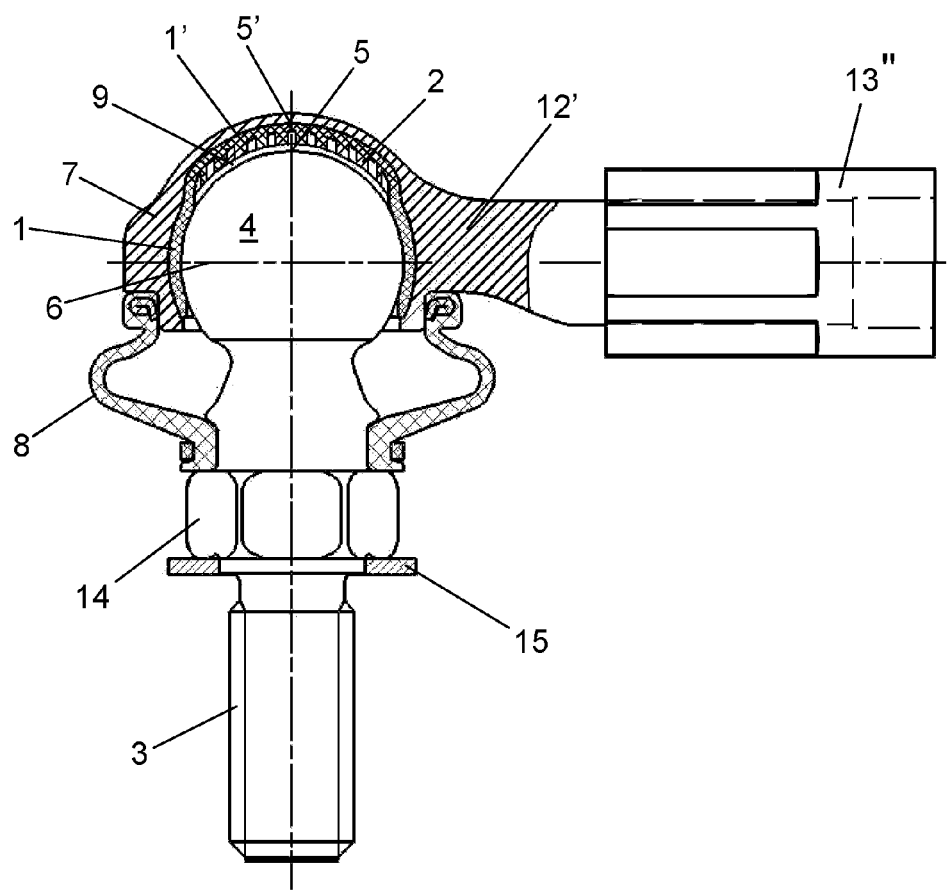
FIG. 3 is a partial sectional view showing another embodiment with a tubular shaft.

FIG. 3 shows other embodiments, which are likewise comparable, in principle, to the embodiments explained above. However, only a stub 12' is prepared by injection here on the joint housing 7 to form a shaft, and this stub is connected to a tube 13", for example, by driving in, in the cold state.

Figure 4:
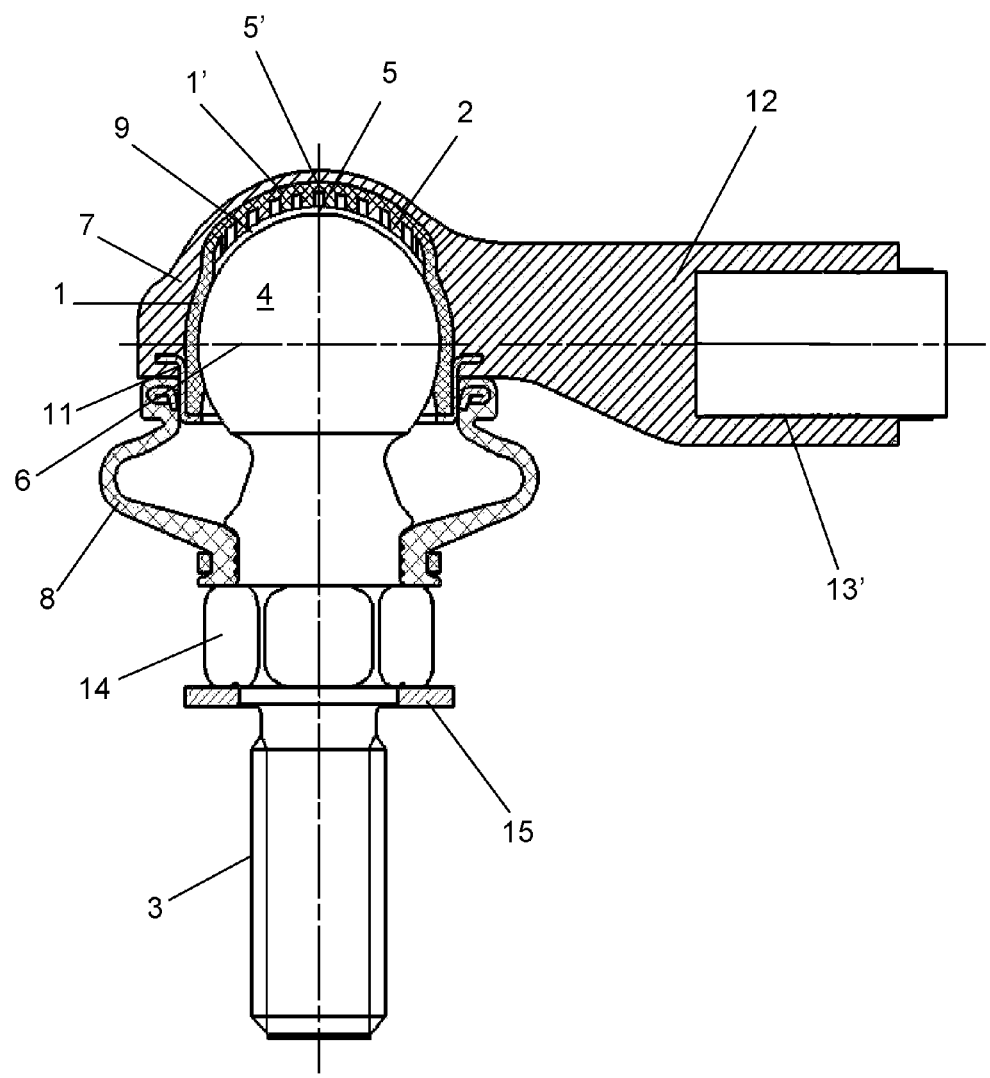
FIG. 4 is a partial sectional view showing an embodiment with a disk inserted in the area of the housing opening between the joint shell and the housing.

FIG. 4 shows a variant of the ball and socket joint according to the present invention, in which an additional ring 11 is inserted as a cover between the joint shell 1, 1' and the joint housing 7 in the area of the shell's opening and extrusion coated at least partially. The cover/ring (one speaks of a metallic cover 11 in case of a metallic joint housing 7) between the joint housing 7 and the ball pivot 4 is advantageously enlarged hereby and the resistance [of the ball pivot] to tearing out is further increased. The cover/ring 11 being arranged between a middle 6 of the spherical shape of the joint ball 4 and the pivot shaft. Like all the embodiments explained above, the ball and socket joint is sealed by a sealing bellows 8 attached after the extrusion coating or casting process against contamination and against the escape of lubricant.

Figure 5C:
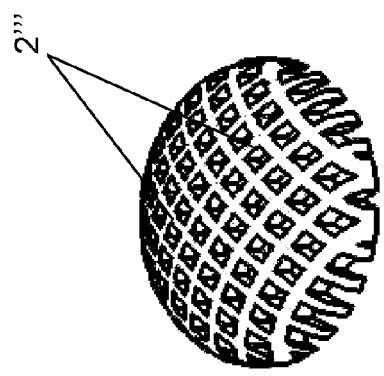
FIG. 5c is a perspective view showing an outside surface of the joint shell.
Figure 5A:
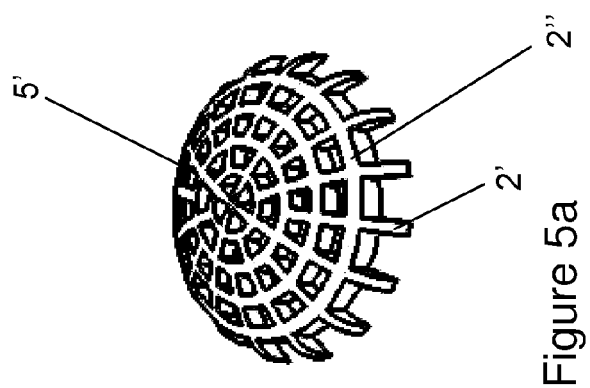
FIG. 5a is a perspective view showing one embodiment of the joint shell.
Figure 5B:
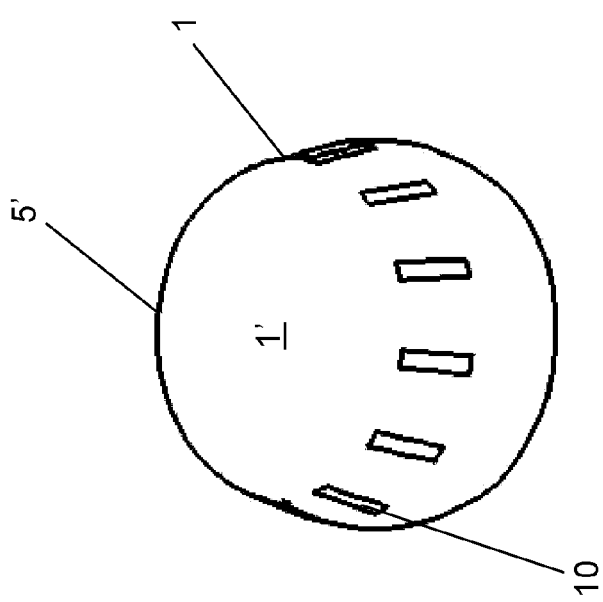
FIG. 5b is another perspective view showing another embodiment of the joint shell.

FIG. 5 shows possible embodiments of the joint shell 1, 1' of the ball and socket joint according to the present invention. The joint shell 1, 1' has, corresponding to the idea of the present invention, a slightly outwardly arching bulge 1' in the area of pole 5'. Its inner surface is contoured by a ribbing 2 in the area of this bulge. Examples of this ribbing 2 are described below under a) and b). In case of the ribbing 2 according to the shape shown in FIG. 5a, a plurality of ribs 2' extend in a radiate pattern starting from pole 5'. A plurality of ribs 2" parallel to one another and to the equator of the ball extend at right angles to these. A plurality of ribs 2''' crossing at right angles relative to the surface projection of the spherical surface of the joint shell 1, 1' are formed in the embodiment according to FIG. 5b. The rib structures shown are shown in the figure as examples and separately from the outer shape of the joint shell 1, 1' for the sake of better illustration only. However, they are always made in one piece with the joint shell 1, 1'. The joint shell 1, 1' shown in FIG. 5c has, moreover, a plurality of ribs 10 or webs on its outer surface, which are used as means for securing against rotation and prevent the rotation of the joint shell 1, 1' in the joint housing 7.

While specific embodiments of the invention have been shown and described in detail to illustrate the application of the principles of the invention, it will be understood that the invention may be embodied otherwise without departing from such principles.

What is claimed is:

1. A ball and socket joint comprising:
a pivot pin with a shaft and a joint ball formed at one end of said shaft;
a joint housing which accommodates said joint ball, said joint housing comprising metal or plastic formed in an injection or casting process and said joint housing being open on one side;
a permanently lubricated spherically shaped joint shell arranged between said joint ball and said joint housing; and
a sealing bellows which seals the open side of said joint housing in an area of a transition between said joint ball and said shaft of said pivot pin, wherein said shaft projects from said joint housing, said joint ball having a pole and in an area of said pole of said joint ball, said joint shell has a outwardly arched bulge providing a bulge region, said bulge region having a shape to form a gap between an inner contour of said joint shell and said joint ball, said bulge region having an elastic behavior to move toward and away from said joint ball in relation to pressure from said joint housing during the injection or casting process, said inner surface of said bulge area being provided with a plurality of intersecting ribs.

2. A ball and socket joint in accordance with claim 1, wherein said joint shell is spherically shaped and said plurality of said ribs extend in a radiating pattern on an inner surface of said outwardly arched bulge starting from a pole of said joint shell, and a plurality of additional ribs are arranged in parallel to one another as well as to an equator of said joint ball extending at right angles to said ribs.

3. A ball and socket joint in accordance with claim 2, wherein one or more webs are arranged on an outer surface of said joint shell facing away from said joint ball to form a means for securing against rotation.

4. A ball and socket joint in accordance with claim 1, wherein said joint shell on an inner surface of said outwardly arched bulge has a plurality of ribs which intersect at right angles relative to a surface projection of the spherical surface.

5. A ball and socket joint in accordance with claim 1, wherein:
said bulge elastically bugles inward in reaction to a pressure of said joint housing when said joint housing is formed in the injection or casting process, said bulge area elastically bulges outwardly after said joint housing is formed in the injection or casting process, in relation to an otherwise spherical shape of said joint shell.

6. A ball and socket joint in accordance with claim 5, wherein:
said elasticity of said bulge is due to a shaping and a selection of a corresponding elastic material.

7. A ball and socket joint in accordance with claim 6, wherein:
said elastic material is one of polyoxymethylene, polyphenylene sulfide and polyphthalamide.

8. A ball and socket joint in accordance with claim 1, wherein:
said elastic behavior of said bulge region providing a restoring force less than a pressure of said joint housing on said bulge region during the injection or casting process to bulge said bulge region inwardly, said restoring force of said elastic behavior of said bulge region being greater than said pressure of said joint housing on said joint shell after a conclusion of the injection or casting process to bulge said bulge region outwardly.

9. A ball and socket joint in accordance with claim 1, wherein:
the movement of the bulge region being caused by pressure from the injection or casting of the housing material thereon/thereto forcing the bulge region to temporarily press inward toward the ball during the injection or casting process, the pressure subsiding after the injection or casting process such that the bulge can return elastically to the position/shape it had prior to the injection or casting process.

10. A ball and socket joint comprising:
a pivot pin with a pin and a joint ball formed at one end of said pin, said joint ball having a radially outer surface;
a joint shell with a radially inner surface and a bulge area, said joint shell being arranged around said joint ball with said radially inner surface of said joint shell in contact with said radially outer surface of said joint ball, said joint shell being formed to have said bulge area elastically biased radially away from said joint ball;
a joint housing extrusion coated radially around said joint shell, said bulge area having an elasticity, said inner surface of said bulge area being provided with a plurality of intersecting ribs.

11. A ball and socket joint in accordance with claim 10, wherein:
said joint shell includes one of polyoxymethylene, polyphenylene sulfide and polyphthalamide.

12. A ball and socket joint in accordance with claim 10, wherein:
said bulge area has the elasticity, and said joint housing is formed, to have said bulge area move with respect to said radially outer surface of said joint ball, movement of said bulge area being caused by pressure from said joint housing being extrusion coated around said joint shell forcing the bulge area to temporarily press inward toward the joint ball during the extrusion coating, the pressure subsiding after the extrusion coating such that the bulge can return elastically to the position/shape it had prior to the extrusion coating.

13. A ball and socket joint comprising:
a pivot pin with a pin and a joint ball formed at one end of said pin, said joint ball having a radially outer surface;
a joint shell with a radially inner surface and a bulge area, said joint shell being arranged around said joint ball with said radially inner surface of said joint shell in contact with said radially outer surface of said joint ball, said joint shell being formed to have said bulge area elastically biased radially away from said joint ball, said inner surface of said bulge area being provided with a plurality of intersecting ribs;
a joint housing extrusion coated radially around said joint shell.

14. A ball and socket joint in accordance with claim 13, wherein:
said plurality of ribs projecting radially inward from said joint shell, said plurality of ribs extending across said bulge area.

15. A ball and socket joint in accordance with claim 13, wherein:
said plurality of ribs including a first set and a second set of ribs, said first set of ribs intersecting with said second set of ribs at right angles.

16. A ball and socket joint in accordance with claim 15, wherein:
said first set of ribs extend in a radiating pattern from a pole position of said bulge area, said second set of ribs being arranged in planes parallel to each other, and to an equator of said joint ball.

17. A ball and socket joint in accordance with claim 13, wherein:
said bulge area has an elasticity, and said joint housing being formed, to have said bulge area move against said radially outer surface of said joint ball when said joint housing is extrusion coated around said joint shell, said elasticity of said bulge area causing, and said joint housing being formed to cause, said bulge area to move away from said radially outer surface of said joint ball after said joint housing is extrusion coated around said joint shell.

18. A ball and socket joint in accordance with claim 13, wherein:
said bulge area has an elasticity, and said joint housing being formed, to have said bulge area move with respect to said radially outer surface of said joint ball, movement of said bulge area being caused by pressure from said joint housing being extrusion coated around said joint shell forcing the bulge area to temporarily press inward toward the ball during the extrusion coating, the pressure subsiding after the extrusion coating such that the bulge can return elastically to the position/shape it had prior to the extrusion coating.

* * * * *